United States Patent [19]

Teran et al.

[11] Patent Number: 5,521,814
[45] Date of Patent: May 28, 1996

[54] PROCESS OPTIMIZATION AND CONTROL SYSTEM THAT PLOTS INTER-RELATIONSHIPS BETWEEN VARIABLES TO MEET AN OBJECTIVE

[75] Inventors: Conrad K. Teran, Puerto La Cruz-Edo Anzoatequi, Venezuela; Delbert Grotewold, The Woodlands, Tex.

[73] Assignee: Betz Laboratories, Inc., Trevose, Pa.

[21] Appl. No.: 324,863

[22] Filed: Oct. 18, 1994

Related U.S. Application Data

[63] Continuation of Ser. No. 54,738, Apr. 29, 1993, abandoned.

[51] Int. Cl.$^6$ .................................................. G06F 17/60
[52] U.S. Cl. .......................... 364/402; 364/148; 364/156; 364/468; 364/500; 395/21
[58] Field of Search .................................... 364/400, 401, 364/402, 148, 149, 151, 156, 496, 497, 500, 468; 395/21–24

[56] References Cited

U.S. PATENT DOCUMENTS

| | | | |
|---|---|---|---|
| 3,648,035 | 3/1972 | Hart et al. | 364/154 |
| 3,725,653 | 4/1973 | Carr et al. | 364/149 |
| 4,858,147 | 8/1989 | Conwell | 364/513 |
| 5,021,166 | 6/1991 | Torpey | 210/709 |
| 5,111,531 | 5/1992 | Grayson et al. | 395/23 |
| 5,159,660 | 10/1992 | Lu et al. | 395/22 |
| 5,175,797 | 12/1992 | Funabashi et al. | 395/22 |
| 5,239,483 | 8/1993 | Weir | 364/497 |
| 5,268,834 | 12/1993 | Sanner et al. | 364/151 |
| 5,282,131 | 1/1994 | Rudd et al. | 364/164 |

OTHER PUBLICATIONS

Administrative Financial Management, by J. F. Bradley, 4th Edition, published 1979, The Dryden Press, pp. 90–94.
Engineering Economy, 6th Edition, by G. J. Thuesen, et al., published 1984, Prentice Hall, Inc., pp. 508–512.

*Primary Examiner*—Robert A. Weinhardt
*Assistant Examiner*—Joseph Thomas
*Attorney, Agent, or Firm*—Caesar, Rivise, Bernstein, Cohen & Pokotilow, Ltd.

[57] ABSTRACT

A process control system uses a performance model, in conjunction with an economic model, to meet either performance or economic objectives. The system operates either automatically, on-line, in "real time" or manually off-line, in "real time" to optimize the process to meet a selected objective. The performance model uses neural networks to determine the interrelationships of each of a set of independent variables (controllable inputs to the process) to each other and their relationship to a set of dependent variables (outputs of the process). The performance model is used to optimize the process to meet performance objectives. The economic model is used in conjunction with the performance model to meet economic objectives.

46 Claims, 15 Drawing Sheets

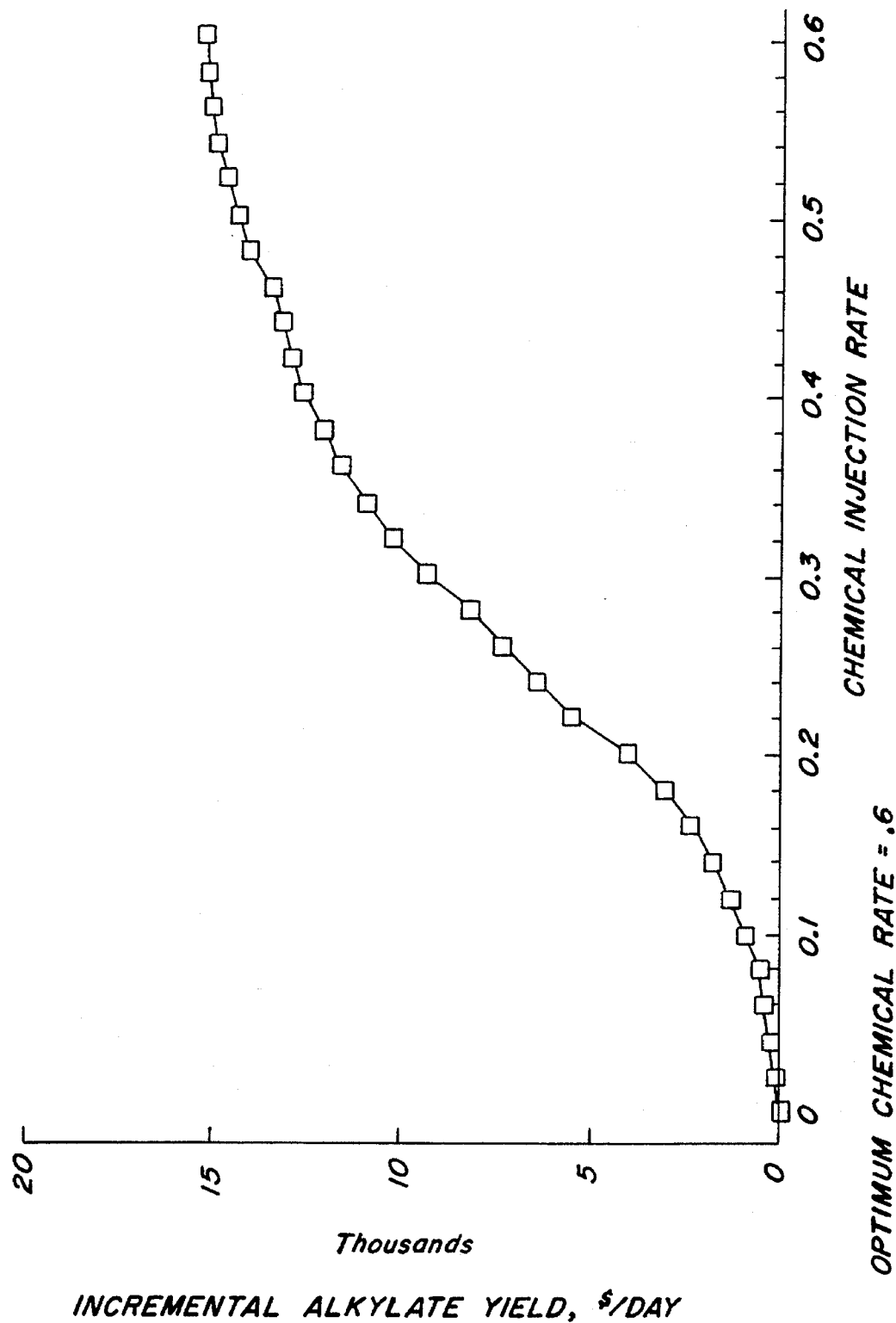

*FIG. 6A*

INDEPENDENT VARIABLES

|  | OLEFIN | RECYCLE | MAKEUP | ACIRC | OTEMP | RECTEMP | SETEMP |
|---|---|---|---|---|---|---|---|
| MIN | 3,442 | 9,290 | 1,448 | 210 | 43.0 | 52.0 | 34.0 |
| MAX | 5,157 | 16,780 | 3,563 | 343 | 67.0 | 67.0 | 52.0 |
| AVG | 4,446 | 13,062 | 2,170 | 283 | 54.8 | 59.2 | 42.9 |

INDEPENDENT VARIABLES

|  | ALEVEL | REFRG | SPENT | %INC | %DEC | VP | OC3 |
|---|---|---|---|---|---|---|---|
| MIN | 25.0 | 357 | 89.60 | -1.36 | 0.00 | 6.1 | 8.84 |
| MAX | 31.0 | 686 | 92.85 | 0.00 | 1.40 | 12.2 | 25.36 |
| AVG | 28.4 | 519 | 91.15 | -0.15 | 0.19 | 8.9 | 16.74 |

INDEPENDENT VARIABLES

|  | OC3 = | OIC4 | ONC4 | OIC4 = | OTC4 = | OCC4 = | DIENE |
|---|---|---|---|---|---|---|---|
| MIN | 8.21 | 13.88 | 3.75 | 14.17 | 6.83 | 4.91 | 0.13 |
| MAX | 31.43 | 20.05 | 13.32 | 24.15 | 13.83 | 9.47 | 0.59 |
| AVG | 17.04 | 16.64 | 7.15 | 18.94 | 8.90 | 7.31 | 0.31 |

FIG. 6B

| | INDEPENDENT VARIABLES | | | | DEPENDENT VARIABLES | | |
|---|---|---|---|---|---|---|---|
| | OIC5 | ONC5 | OIC5= | WATEMP | YIELD | ACID | RON |
| MIN | 0.47 | 0.04 | 0.39 | 70.0 | 3,358 | 4.15 | 91.50 |
| MAX | 7.81 | 1.23 | 6.84 | 90.0 | 5,093 | 10.90 | 94.00 |
| AVG | 3.98 | 0.45 | 2.55 | 81.0 | 4,365 | 6.78 | 92.58 |

| VAR ID | DESCRIPTION |
|---|---|
| OLEFIN | OLEFIN FEED, BPD |
| RECYCLE | RECYCLE ISOBUTANE, BPD |
| MAKEUP | MAKEUP ISOBUTANE, BPD |
| ACIRC | ACID CIRCULATION, GPM |
| OTEMP | OLEFIN TEMPERATURE, DEG. F |
| RECTEMP | RECYCLE TEMPERATURE, DEG. F |
| SETEMP | SETTLER TEMPERATURE, DEG. F |
| ALEVEL | ACID LEVEL, % |
| REFRG | REFRIGERATION FLOW, MSCFH |
| SPENT | SPENT ACID, WT% H2SO4 |
| %INC | SPENT ACID INCREASE, PREVIOUS DAY, % |
| %DEC | SPENT ACID DECREASE, PREVIOUS DAY, % |
| VP | ALKYLATE REID VAPOR PRESSURE, PSI |
| OC3 | OLEFIN FEED PROPANE CONTENT, MOLE% |
| OC3= | OLEFIN FEED PROPYLENE CONTENT, MOLE% |
| OIC4 | OLEFIN FEED ISOBUTANE CONTENT, MOLE% |
| ONC4 | OLEFIN FEED N-BUTANE CONTENT, MOLE% |
| OIC4= | OLEFIN FEED 1&2BUTENE CONTENT, MOLE% |
| OTC4= | OLEFIN FEED T-BUTENE CONTENT, MOLE% |
| OCC4= | OLEFIN FEED C-BUTENE CONTENT, MOLE% |
| DIENE | OLEFIN FEED BUTADIENE CONTENT, MOLE% |
| OIC5 | OLEFIN FEED ISOPENTANE CONTENT, MOLE% |
| ONC5 | OLEFIN FEED N-PENTANE CONTENT, MOLE% |
| OIC5= | OLEFIN FEED ISOPENTENE CONTENT, MOLE% |
| WATEMP | COOLING WATER TEMPERATURE, DEG. F |
| YIELD | ALKYLATE YIELD, BPD |
| ACID | ACID CONSUMPTION, GPM |
| RON | RESEARCH OCTANE NUMBER |

FIG. 6C

| DEPENDENT VARIABLES | INDIVIDUAL POINTS MODEL | | | 5 POINT SUBGROUP MODEL | | |
|---|---|---|---|---|---|---|
| | SE | R2 | SD | SE | R2 | SD |
| ALKYLATE YIELD, BPD | 68.03 | 0.97 | 55.29 | 46.66 | 0.99 | 25.14 |
| ACID CONSUMPTION, GPM | 0.45 | 0.87 | 0.37 | 0.32 | 0.95 | 0.18 |
| RESEARCH OCTANE NO. | 0.20 | 0.87 | 0.37 | 0.13 | 0.96 | 0.08 |

NO. OF MEASUREMENTS: 293  NO. OF SUBGROUPS: 59
NO. OF INDEPENDENT VARIABLES: 25  NO. OF DEPENDENT VARIABLES: 3

INDIVIDUAL POINTS MODEL PREDICTION LIMITS

| DEPENDENT VARIABLES | LCL | AVG-2SD | AVG-1SD | AVG | AVG+1SD | AVG+2SD | UCL |
|---|---|---|---|---|---|---|---|
| ALKYLATE YIELD, BPD | 4,199 | 4,255 | 4,310 | 4,365 | 4,421 | 4,476 | 4,531 |
| ACID CONSUMPTION, GPM | 5.66 | 6.03 | 6.41 | 6.78 | 7.15 | 7.53 | 7.90 |
| RESEARCH OCTANE NO. | 92.05 | 92.23 | 92.40 | 92.57 | 92.75 | 92.92 | 93.09 |

5 POINT SUBGROUP MODEL PREDICTION LIMITS

| DEPENDENT VARIABLES | LCL | AVG-2SD | AVG-1SD | AVG | AVG+1SD | AVG-1SD | UCL |
|---|---|---|---|---|---|---|---|
| ALKYLATE YIELD, BPD | 4,290 | 4,315 | 4,340 | 4,365 | 4,390 | 4,416 | 4,441 |
| ACID CONSUMPTION, GPM | 6.23 | 6.41 | 6.60 | 6.78 | 6.96 | 7.15 | 7.33 |
| RESEARCH OCTANE NO. | 92.32 | 92.41 | 92.49 | 92.57 | 92.66 | 92.74 | 92.82 |

| POINT SUBGROUP MODEL VALIDATION | | | | | |
|---|---|---|---|---|---|
| SUBGROUP* | VARIABLE | ACTUAL | MODEL | DELTA | % |
| 1 | ALKYLATE YIELD, BPD | 4,552 | 4,542 | 9.92 | 0.22% |
| 2 | ALKYLATE YIELD, BPD | 4,463 | 4,464 | -1.15 | -0.03% |
| 3 | ALKYLATE YIELD, BPD | 4,459 | 4,622 | -163.52 | -3.67% |
| | AVG YIELD | 4,491 | 4,543 | 51.58 | -1.15% |
| 1 | ACID CONSUMPTION, GPM | 7.56 | 7.94 | -0.39 | -5.15% |
| 2 | ACID CONSUMPTION, GPM | 7.38 | 7.56 | -0.18 | -2.40% |
| 3 | ACID CONSUMPTION, GPM | 8.10 | 7.49 | -0.61 | 7.47% |
| | AVG ACID | 7.68 | 7.67 | 0.01 | 0.17% |
| 1 | RESEARCH OCTANE NO. | 92.12 | 92.23 | -0.11 | -0.12% |
| 2 | RESEARCH OCTANE NO. | 92.54 | 92.37 | 0.17 | 0.19% |
| 3 | RESEARCH OCTANE NO. | 92.50 | 92.29 | 0.21 | 0.23% |
| | AVG RON | 92.39 | 92.29 | 0.09 | 0.10% |

*SUBGROUPS REPRESENT LAST 15 AVAILABLE DATE THROUGH 7/24/91

| DEFINITIONS | |
|---|---|
| SE | STANDARD ERROR OF MODEL ESTIMATE |
| R2 | CORRELATION COEFFICIENT |
| SD | POPULATION STANDARD DEVIATION |
| UCL | UPPER CONTROL LIMIT = AVG + 3 * SD |
| LCL | LOWER CONTROL LIMIT = AVG - 3 * SD |
| AVG | ARITHMETIC AVERAGE |

*FIG. 6D*

PROCESS OPTIMIZATION AND CONTROL SYSTEM THAT PLOTS INTER-RELATIONSHIPS BETWEEN VARIABLES TO MEET AN OBJECTIVE

This application is a continuation of application Ser. No. 08/054,738, filed Apr. 29, 1993, now abandoned.

BACKGROUND OF THE INVENTION

This invention relates generally to process control systems and more particularly to a system which uses a performance model in real time as well as an economic model to control processes.

At the present time, the operations of industrial processes are analyzed using regression analysis, which applies curve fitting to historical data. In regression analysis, only a single dependent variable can be studied with relation to a set of independent variables. In this type of analysis, the interaction between the independent variables is not taken into account.

Neural networks, which determine the interaction between independent variables, are also used to analyze the operation of existing systems. As is known by those familiar with the art, neural networks solve problems by attempting to simulate the operation of the human brain. The brain has approximately 100 billion cells of more than 100 types, and many of the cells have more than one thousand interconnections to other cells. It can easily outperform any of the current approaches with respect to recognizing patterns and can quickly determine reasonable solutions to complex problems.

Neural network models use groups of "neurons" to emulate brain cells. The neurons are arranged in structural units or layers. In feed forward networks, each of the neurons of a layer gets an input from a preceding layer and sends an output to a succeeding one. Each neuron in a layer is connected to every other neuron of the succeeding layer. Another type of neural network has feedback from layers to preceding layers.

As is the case with the human brain, input, hidden and output layers of neurons are used. The hidden layer can be a single layer of neurons or can comprise multiple layers of neurons. Each of the neurons of the input layer receives a single input (independent variable). A weighting function is associated with, and determines the level of, each of the inputs to an input neuron.

Each neuron in the output layer represents a dependent variable whose value changes due to changes in the values of the independent variables and the interactions between the independent variables. The output of each neuron is modified by a transfer function. Various types of transfer functions, such as linear, linear threshold (which sets a maximum and minimum level to the function), step, Sigmoid (S-shaped), hyperbolic tangent or Gaussian functions can be used.

Historical data representing the independent input variables of a system are provided to the neural network model and the dependent variables (outputs) of the system are determined and compared to the actual output of the system at the time. A learning rule is inserted into the neural network which enables the neural network to reset the weighting values at the inputs of the network each time historical data is entered so that it may more accurately predict the outputs of the system. Some specific examples of the use of neural networks include improving the accuracy of the analysis of sonar signals, the diagnosis of jet engine problems, and the determination of space craft attitude. However, models which can predict plural output variables of a process based upon changes in plural input variables which interact with each other, have not been used previous to this invention, to control industrial or chemical processes in "real time" or "on-line". The term "real time", as used herein, is a process control system which either automatically changes the process, or changes the process within a short time period after the process control system indicates that a change is necessary, while the process is in progress. The term "on-line", as used herein, refers to a system which automatically receives information from, and automatically inserts changes into, the process, while the process is in progress.

In addition to the need for process control systems which operate to control processes on-line and/or in real time, there is also a need for process control systems which employ economic models in conjunction with performance models and which enable the optimization of the system to meet economic goals in addition to other types of performance goals.

OBJECTS OF THE INVENTION

Accordingly, it is a general object of the instant invention to provide a process control system which overcomes the shortcomings of, and improves upon, existing process control systems.

It is a further object of the instant invention to provide a process control system which optimizes the process for a system with a plurality of interactive independent (controllable) variables and a plurality of dependent (output) variables, It is still a further object of the instant invention to provide a process control system which uses an economic model in conjunction with a process model to optimize the process.

It is still yet a further object of the instant invention to provide a process control system which optimizes a process in real time while the process is being performed.

It is another object of the instant invention to provide a process control system which optimizes a process for a selected one of the independent variables.

It is still another object of the instant invention to provide a process control system which optimizes the process in relation to a selected one of the dependent variables.

It is still yet another object of the instant invention to provide a process control system which automatically changes the level of a selected independent variable to meet a selected one of a plurality of operating or economic objectives.

It is an additional object of the instant invention to provide a process control system which periodically optimizes the level of a selected independent variable to meet a selected one of a plurality of operating or economic objectives.

SUMMARY OF THE INVENTION

These and other objects of the instant invention are achieved by a process control system having a process model and an economic model. The system accepts information from an operating process and calculates values of dependent (output) variables versus a selected one of the independent variables. Objectives or goals are inserted into the process control system which relate to optimizing the system either with respect to the levels, quantity or quality of the independent variables of the process or with respect to economic objectives or criteria. If economic objectives are selected, the economic model is used in conjunction with the process model in order to optimize the level of the selected independent variable to meet the goal.

Historical data is used to develop the process model so that it may determine the interrelationship between the output variables and the interactive independent input variables. The process model comprises a neural network which learns from the application of historical data to predict the levels of dependent variables with changes in the controllable or independent variables.

DESCRIPTION OF THE DRAWING

Other objects and many of the intended advantages of this invention will be readily appreciated when the same becomes better understood by reference to the following detailed description when considered in connection with the accompanying drawing wherein:

FIG. 4A is a graph of the total product yield (alkylate yield) in thousands of dollars per day plotted against the chemical injection rate of the process;

FIGS. 6A and 6B show in tabular form the historical data relating to dependent and independent variables taken for an operating process; and FIGS. 6C and 6D tabulate the results obtained using the process control system model and the statistical accuracy of the model.

DETAILED DESCRIPTION OF THE PREFERRED EMBODIMENT

The preferred embodiment, which is described in detail below, is for a chemical process control system which optimizes the on-line performance of the reaction or distillation portion of a petroleum refinery which produces gasoline. The independent variable which is optimized to meet various objectives is, in the example given, the flow rate of a chemical additive which is added to the process to improve the efficiency of the process. It should be noted, however, that the process control system described herein is equally applicable to other types of industrial or chemical processes and is capable of determining the optimal flow rate, quantity, quality or other parameter of any independent variable to meet objectives.

The system uses a process model and an economic model, which is utilized when economic goals are to be met. A single independent variable is selected and the system determines the levels of the dependent variables over a pre-selected range of levels of the independent selected variable, as will be explained in detail below. In effect, the levels of the output or dependent variables are "plotted" and stored over the range of the levels of selected variables (See FIGS. 3 and 4A–4F). For non-economic goals, the system determines the plot maximum or minimum to calculate the optimum level of the selected independent variable to meet the goal. To meet economic goals, economic values are inserted into the system to modify the plots prior to calculating the optimum level of the selected independent variable to meet the goals.

Figure 1:
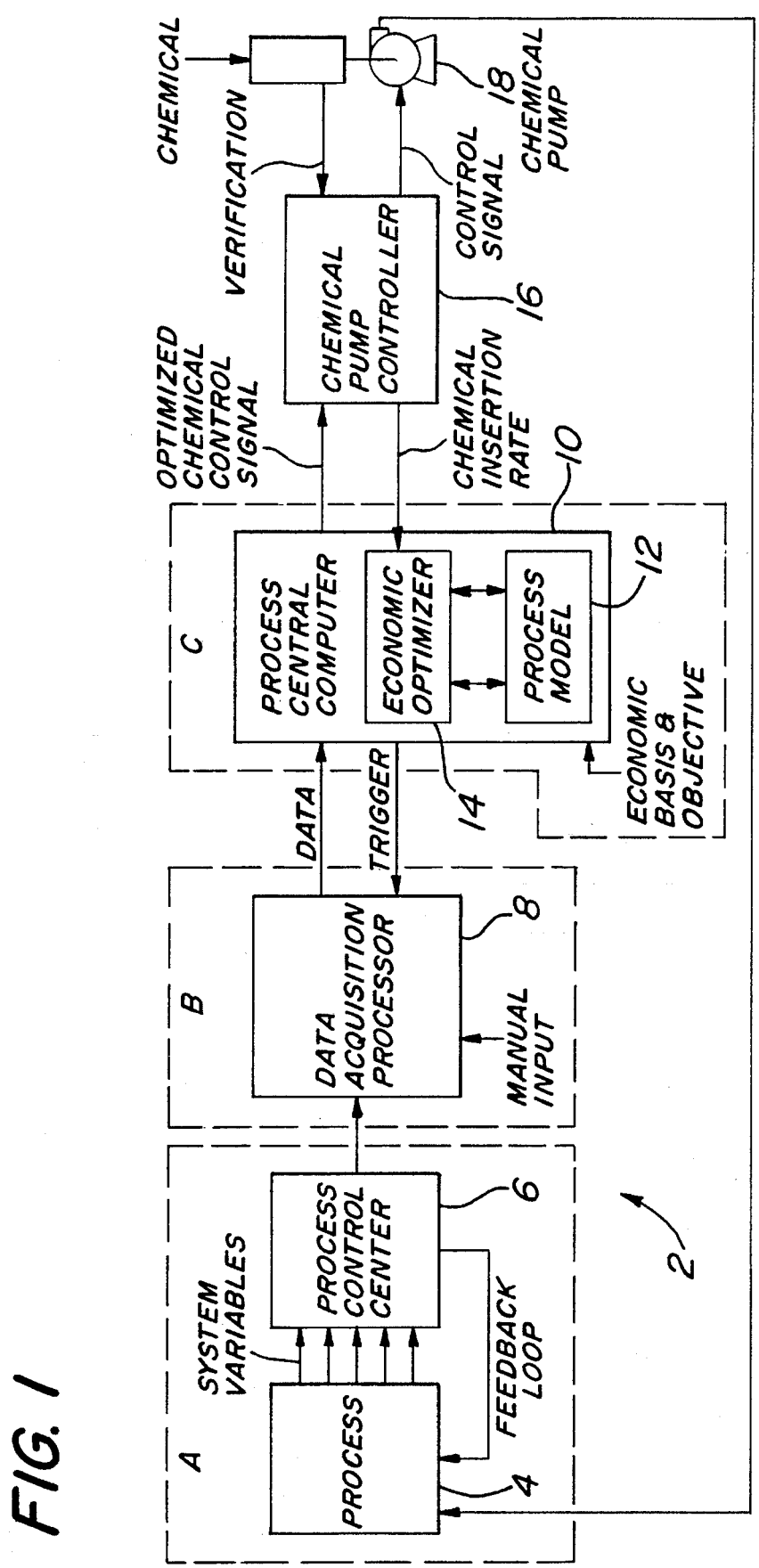
FIG. 1 is a block diagram of the process control system constructed in accordance with this invention for controlling the introduction of a chemical into a petroleum reaction (alkylation) system.

Referring now in greater detail to the various figures of the drawing wherein like references and characters refer to like parts, a block diagram of the process control system 2 of the instant invention is shown in FIG. 1. The input section A comprises the process 4. The quantitative levels of the system variables of process 4 are transmitted to process control center 6. The process control center 6 provides information to personnel at the refinery as to the level or value i.e. quantity, quality, or flow rates, of the variables of the system. The system variables' levels of the process 4 may be changed via controls in the process control center 6. A feedback loop is used between the process control center 6 and the process, to zero-in the level of the system variable which has been adjusted to the desired level from the process control center 6. The levels of the variables of process 4 can either be automatic and electronic in nature, which can be processed directly by the process control system 2. If they are analogue in nature, they operate indicators such as gauges or meters, which are received in the process control center 6.

If the levels of the system variables are in electronic form, i.e. digital form, the process control center 6 transmits the electronic signals to the Data Acquisition and Processing Section B. The Data Acquisition and Processing Section B has a data acquisition processor 8 which processes and stores the incoming electronic signals representing the system variables. In the case wherein the levels of the system variables are available only in analogue form, such as on meters, gauges and the like, the information is recorded at the process control center 6 and manually input to the data acquisition processor 8 via a keyboard or other input equipment attached thereto.

The Process Control Section C of the system comprises a process control computer 10. The process control computer 10 utilizes software which includes a process model 12 and an economic optimizer 14. On command via a trigger signal from the process control computer 10, the data acquisition processor 8 transmits the data, i.e., the levels of the system variables in digital, electronic form, to the process control computer 10. In addition, via a keyboard or other suitable entry device, economic values and objectives are entered into the process control computer 10.

The output of the process control computer 10 is an optimized chemical control signal which represents the optimal flow rate of the chemical which should be inserted into the process to meet the objective. The objective and economic basis are also entered and stored into the process control computer 10. If an automatic system is available to control a pump which feeds a chemical additive into the process, a chemical pump controller 16 is used. Equipment such as the Pacesetter, which is available from Betz Laboratories, Inc., and which is described in U.S. Pat. No. 4,897,797, can be used to control the chemical pump 18. The chemical pump controller 16 feeds back the actual injection rate of the chemical pump to the process control computer 10.

The chemical pump controller 16 transmits a control signal to the chemical pump 18 which controls the action of the pump to change the chemical rate of flow into the process. A verification signal is also received by the chemical pump controller 16 from the process, which verifies that the desired flow rate has been achieved.

The process model 12 in this embodiment is a neural network model. A suitable neural network model program such as the Professional Two Plus program produced by Neural Ware, Pittsburgh, Pa., or equivalent may be used and customized for this control system. Historical data must, therefore, be entered into the system to enable the neural network model to learn, as previously described. An historical data bank is developed by recording the values or levels of the system variables at predetermined intervals over a predetermined period of time. This historical data is input to the data acquisition processor 8 via its manual input, and then used by the process model to enable the process model 12 to learn to better predict selected outputs of the system with changes in the interacting variables of the system over time. The accuracy of the process model 12 in predicting outputs of the system (the levels of the dependent variables) from a large number of sets of values of independent variables has been determined using actual operating processes, as will be described in detail later.

Figure 2A:
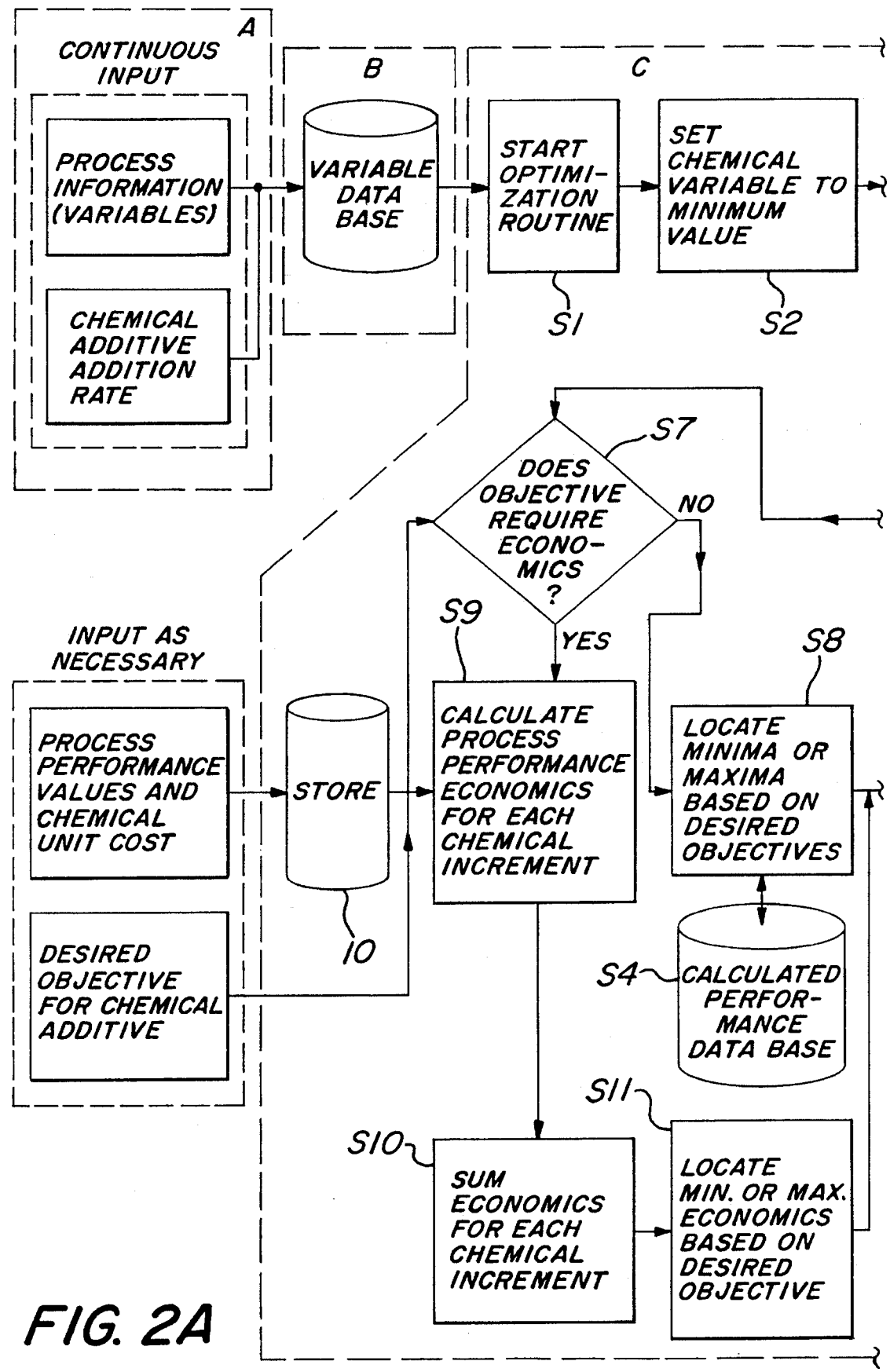
FIGS. 2A and 2B together comprise a flow chart of the operation of the process control system of FIG. 1.
Figure 2B:
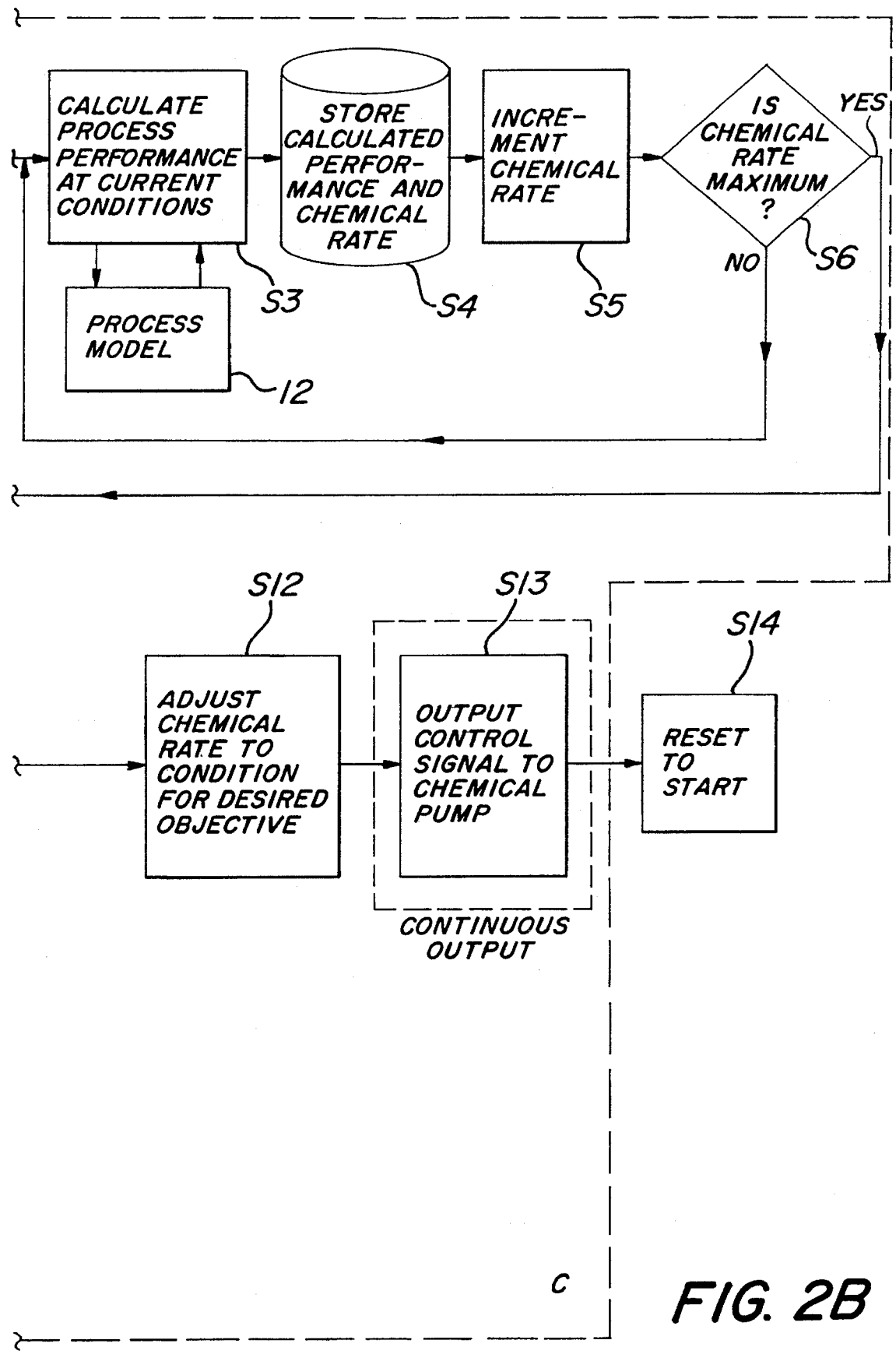

FIGS. 2A and 2B show a flow diagram of the system. Continuous inputs from the process, comprising information as to the levels of the variables and the chemical additive rate (the selected independent variable) are transmitted from Block A to the variable data base Block B which is part of the data acquisition processor 8. The starting of the optimization routine, step S1, can be performed either automatically, at preset timed intervals, while the process is in operation, or it can be started by depressing a manual start button. When the routine is started, the value of the chemical variable is set to a minimum in step S2. The minimum value of the chemical variable and the values of the other variables from the variable data base clock B are sent to the process control computer 10 which then uses the process model 12 to calculate the performance of the process, i.e., the levels of the dependent variables, at current conditions, as shown in step S3. The calculated performance i.e. predicted levels of the dependent variables and chemical rate is then stored in step S4. The chemical rate is then incremented to its next predetermined value in step S5. Step S6 is a decision step which determines whether the chemical rate that has been incremented is at its maximum allowable rate. If the answer is negative, the process performance is recalculated at the newly incremented chemical rate and step S3–step S5 are repeated.

Figure 3:
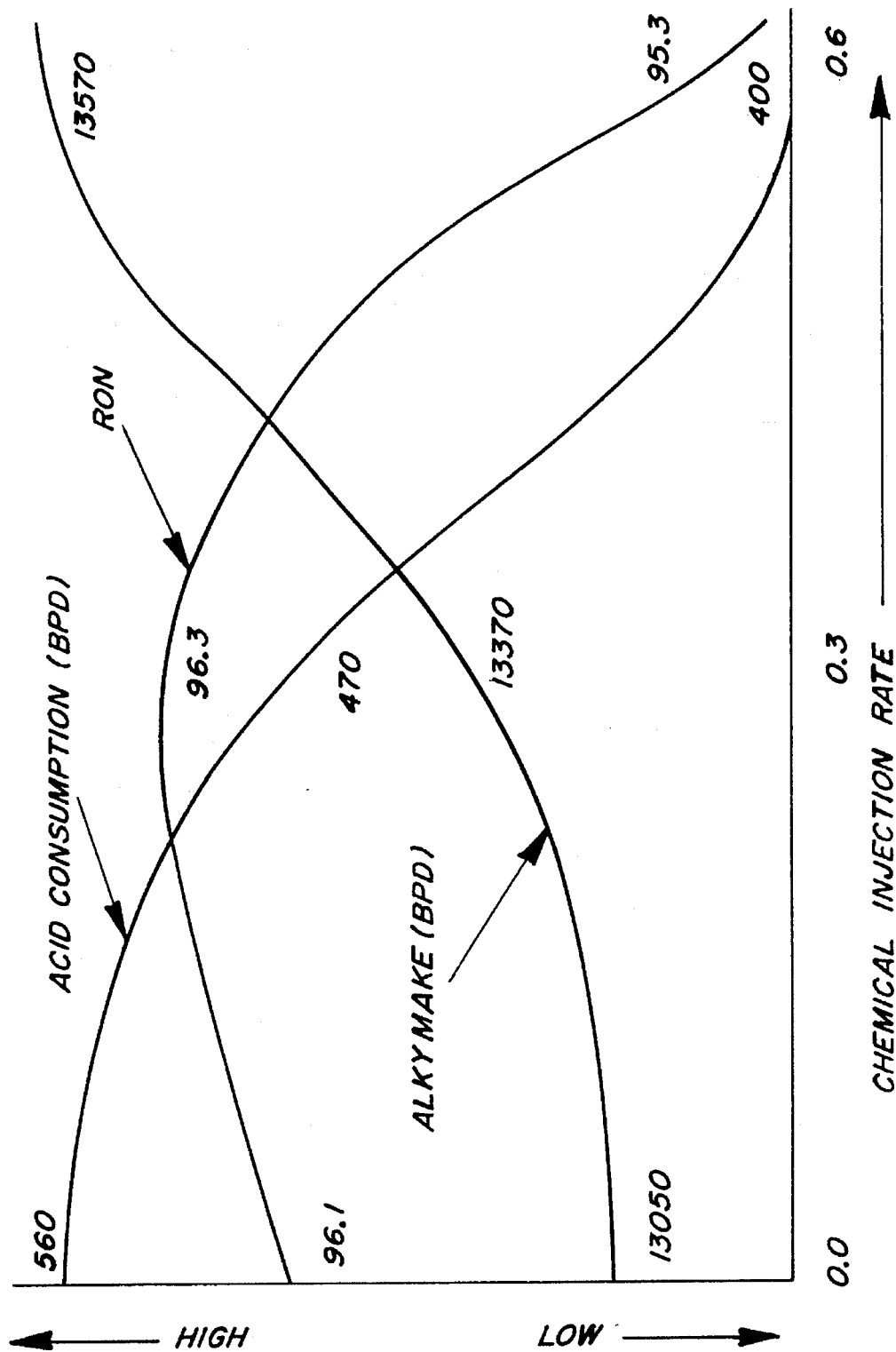
FIG. 3 is a graph of the levels of various dependent variables of the petroleum reaction process, plotted against the chemical injection rate as established by the system of FIG. 1.

For each increment in level of the chemical rate, the levels of the dependent variables are determined, in effect providing a graph or plot, as shown in FIG. 3 which will be described later.

When the iterative process is completed, i.e., when the chemical rate has been incremented in steps until it has reached its maximum rate, the output step S6 is in the affirmative. Decision step S7 determines whether the objective entered into the system requires economic calculations.

Prior to the start of the optimization routine, if economic goals are to be met, economic data relating to process performance values and chemical unit costs as shown in block D is entered into, and stored in, the process control computer 10. In addition, the desired objective for the chemical additive is entered into the system providing an input for decision step S7.

Before proceeding further with a discussion of the flow diagram of FIG. 2, the stored calculated performance and chemical rate should be discussed. FIG. 3 shows the results of the calculated performance and chemical rate, taken by the process control system for an actual operating process, in graph form.

The chemical injection rate is the ratio of chemical additive to flow into the process to the flow of catalyst sulfuric acid into the process in percent. As can be seen in FIG. 3, the chemical injection rate varies from 0 to 0.6% of the catalyst flow rate.

In this case four dependent variables have been chosen for the process. One of these is the Acid consumption in barrels per day. The Acid consumption in this case is the amount of sulfuric acid used, which is the catalyst for the reaction operation. As can be seen in the chart as the chemical injection rate is incremented from zero to 0.6, the acid consumption rate, i.e., the consumption of the catalyst, varies from a high of 560 barrels per day for a zero chemical injection rate, to a low of 400 barrels per day for a chemical injection rate of 0.6. A second dependent variable is the Research Octane Number (RON). As can be seen in FIG. 3, the RON varies between 96.1 at a zero chemical injection rate to 95.3 at a 0.6 chemical injection rate, peaking at approximately 0.3 chemical injection rate, at a RON of 96.3.

A third dependent variable is entitled the Alky Make in barrels per day. The Alky Make is the output of the commercial alkylation unit and represents the amount of gasoline that the process is producing. The Alky Make varies from a low of 13,050 to a high of 13,750 barrels per day as the chemical injection rate is increased.

Referring again to FIG. 2, certain objectives do not require economic analysis. For example, if the objective were to maximize RON, the system would only have to determine, from the calculated performance information, the chemical injection rate which maximizes RON, in this case a 0.3 chemical injection rate. Similarly, if the objective was to maximize production or Alky Make, or to minimize Acid consumption, the system would only have to determine the chemical injection rate which maximizes Alky Make or which minimizes Acid consumption (in this case a chemical injection rate of 0.6). Thus, economic analyses are not required and the path from the negative side of step S7, to step S8, which locates the maxima or minima based on a desired objective, is taken as shown in FIG. 2A.

Figure 4B:
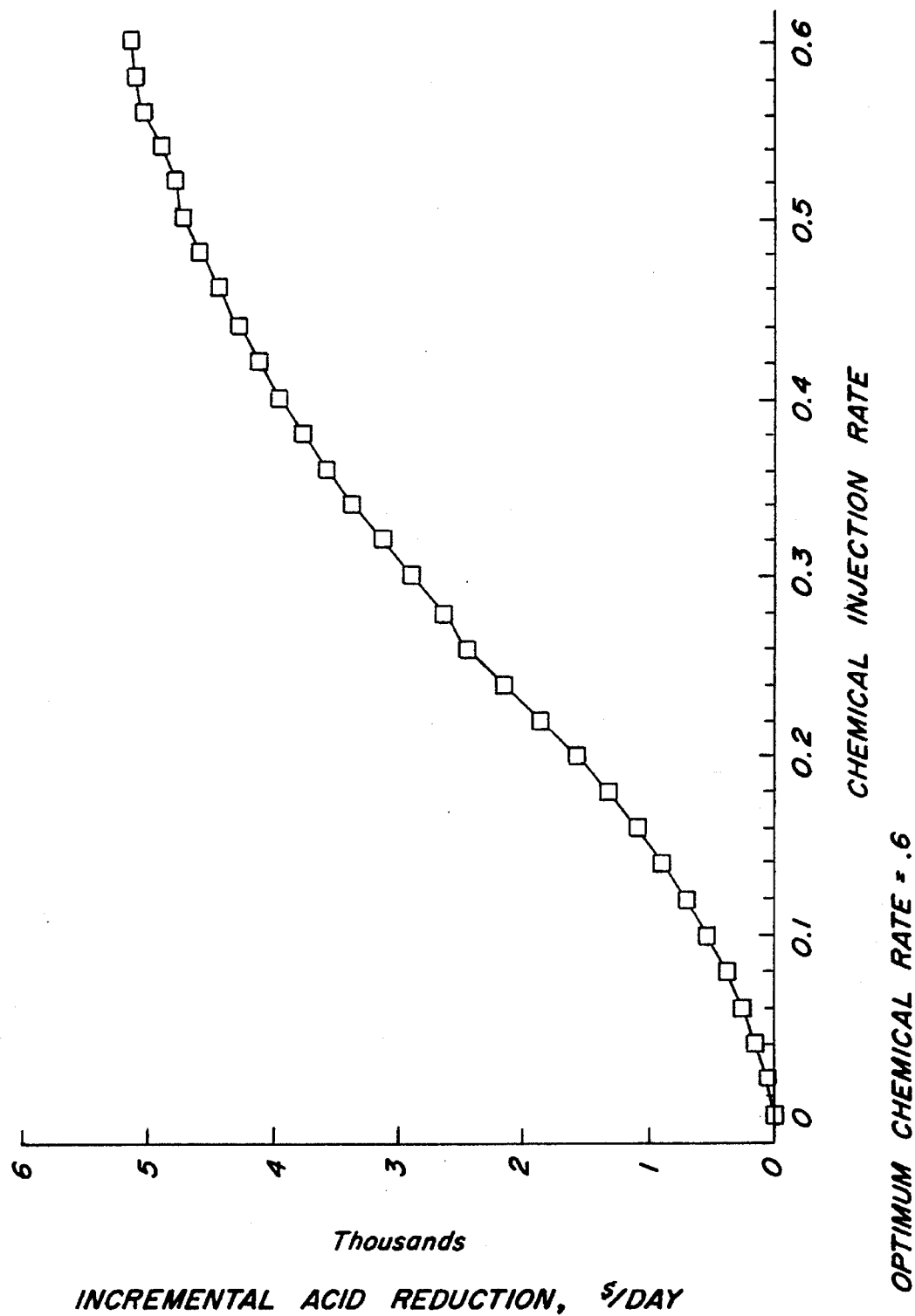
FIG. 4B is a graph of the incremental acid (catalyst) reduction in thousands of dollars per day plotted against the chemical injection rate of the process.
Figure 4C:
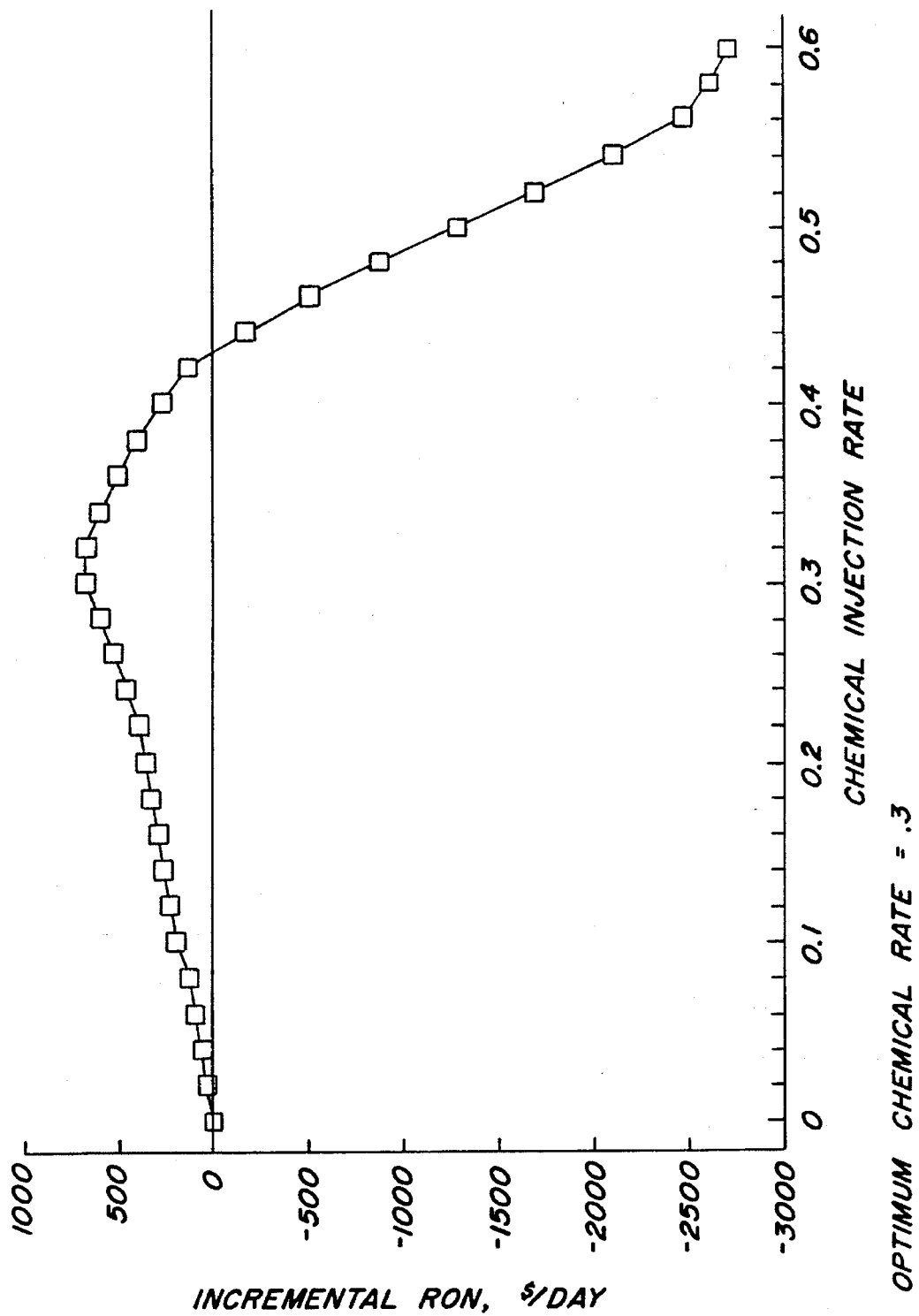
FIG. 4C is a graph of the incremental RON (Research Octane Number) in terms of dollars per day plotted against the chemical injection rate of the process.

FIGS. 4A–4F show the results of optimization to reach various economic objectives. For example, FIG. 4A shows the value of the Alky Yield in thousands of dollars per day as the chemical injection rate is varied from zero to 0.6. In this case, the dollar value of each barrel of the barrels of gasoline at various octane numbers are entered into the system to generate the graph of FIG. 4A. Thus, the value of the incremental or increased yield of the process in thousands of dollars per day rises to approximately fourteen thousand dollars for chemical injection rates of 0 to 0.6. Similarly, in FIG. 4B the dollar value of the incremental reduction in Acid or catalyst requirements peaks at approximately five thousand dollars per day at a chemical injection rate of 0.6. Also, as shown in FIG. 4C the incremental value of the Research Octane Number (RON) in dollars per day peaks at six hundred dollars at a chemical injection rate of 0.3.

Figure 4D:
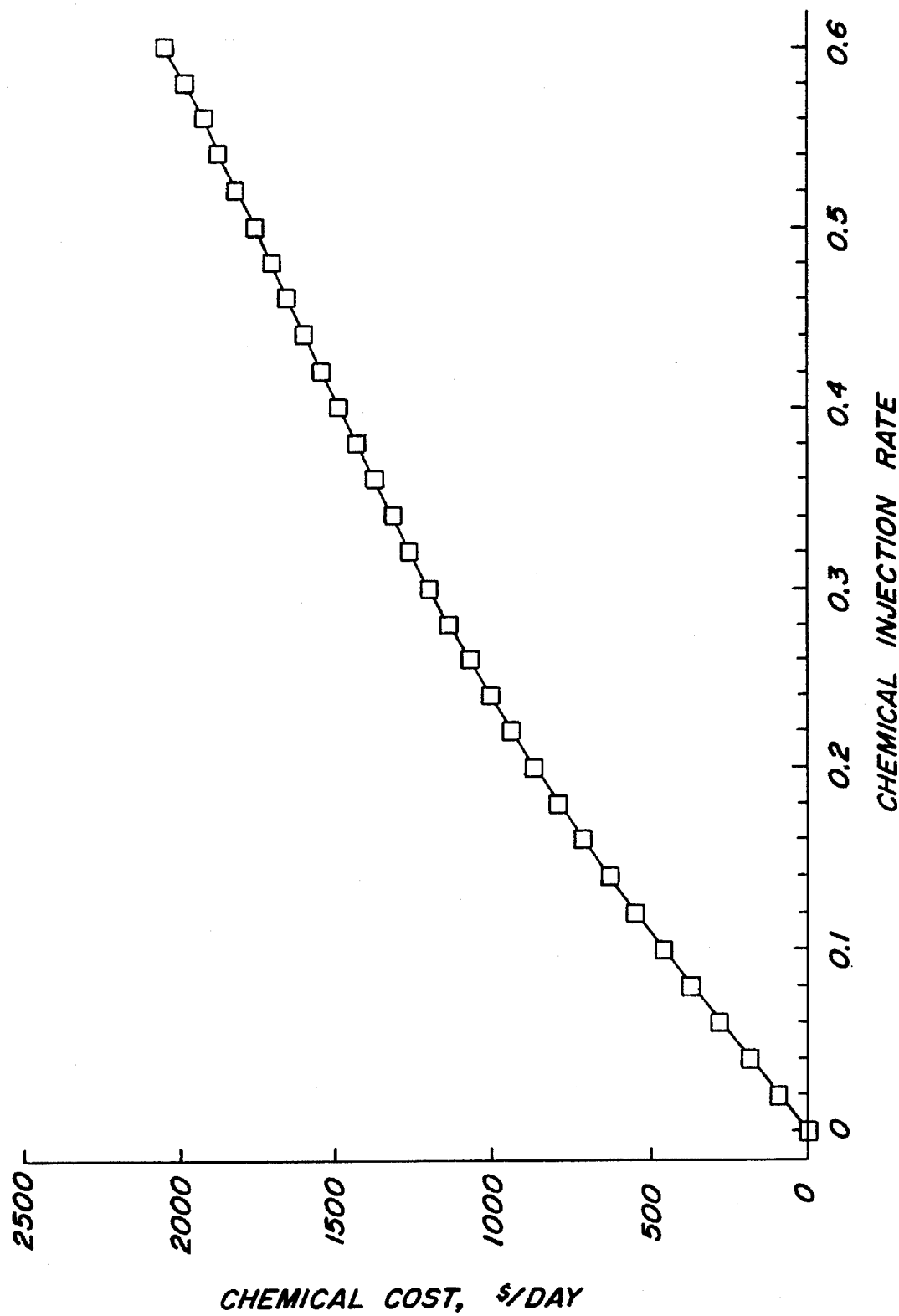
FIG. 4D is a graph of the cost of the chemicals in dollars per day plotted against the chemical injection rate of the process.

FIG. 4D shows that the chemical cost in dollars per day rises from 0 to approximately 2,000 as the chemical injection rate increases from 0 to 0.6.

Figure 4E:
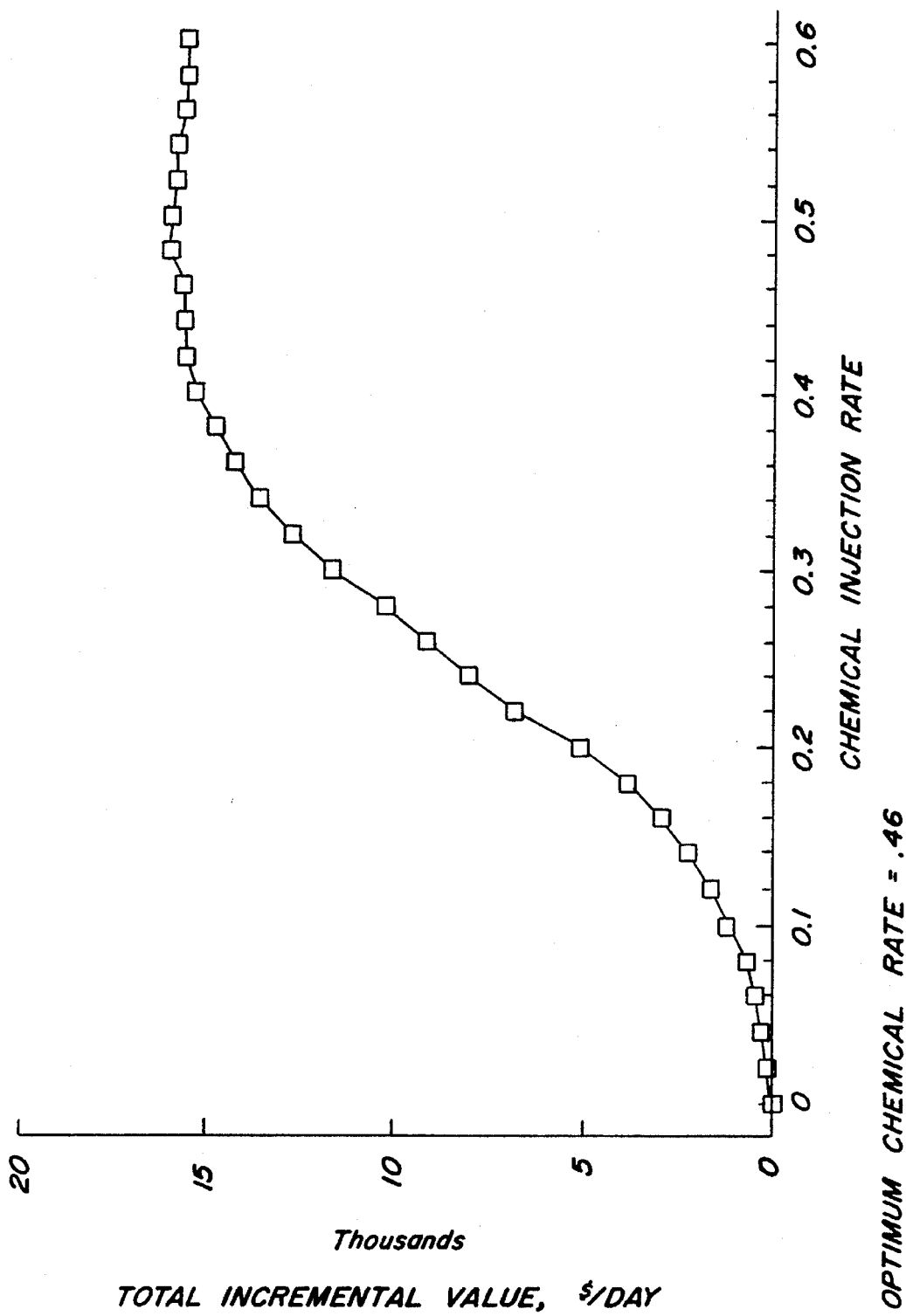
FIG. 4E is a graph of the total incremental value of the process output in thousands of dollars per day plotted against the chemical injection rate of the process.

In addition to these economic calculations, more complex economic calculations can be made by the system. For example, as shown in FIG. 4E, the incremental value of the system which is the value of the product produced, less the costs involved in producing the product, is shown in FIG. 4E for various chemical injection rates. As can be seen in the figure, the total value curve begins to flatten out at approximately sixteen thousand dollars per day peaking at a chemical injection rate of 0.47.

Figure 4F:
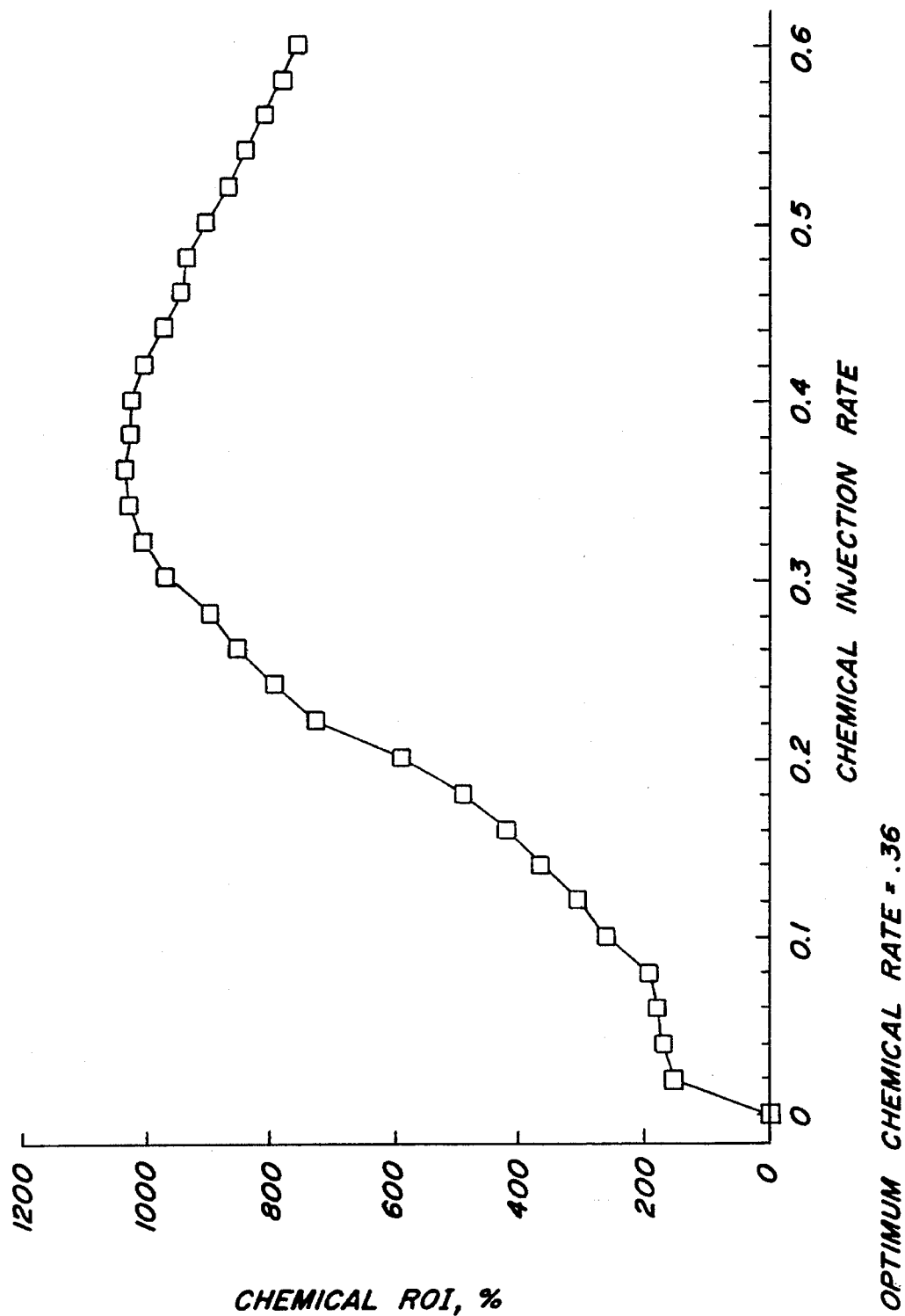
FIG. 4F is a graph of the chemical ROI (Return On Investment) in percentages plotted against the chemical injection rate of the process.

FIG. 4F shows the variation in chemical ROI in percent, i.e., the total return minus the chemical cost, divided by the chemical cost. This plot indicates that for the actual process being controlled, a chemical injection rate of 0.35 will maximize the chemical ROI.

FIGS. 4A–4F show the actual performance results obtained at a process of a particular alkylation or reaction unit in commercial use. Although six specific economic objectives have been chosen and illustrated in this case, it will be appreciated that the process control system can optimize the process for a large number of other economic objectives.

Referring again to the flow diagram of FIGS. 2A and 2B the flow of information for combining economic calculations with performance calculations will be described. If the output of step S7 is affirmative, the economic model calculates the process performance economics for each chemical increment using information from the calculated performance base of step S4 and the performance value and chemical unit cost from the stored data base in the process control computer, in step S9. In step S10 economics for each chemical increment are summed. The minimum or maximum economics based on the desired objective is determined in step S11. In step S12 the chemical rate is adjusted to meet the desired objective.

In systems wherein there is automatic control for the chemical pump an output signal is sent to the pump to automatically adjust the chemical rate to the optimal condition for the desired objective, as shown in step S13. If the system does not have an automatic means to reset the chemical rate, a readout or display indicating the optimal chemical rate can be provided to an operator, who then manually adjusts the controls necessary to obtain the desired chemical rate.

The final step S14 resets the system to start the process again. This may be done automatically with a timer or manually at pre-determined times.

Figure 5:
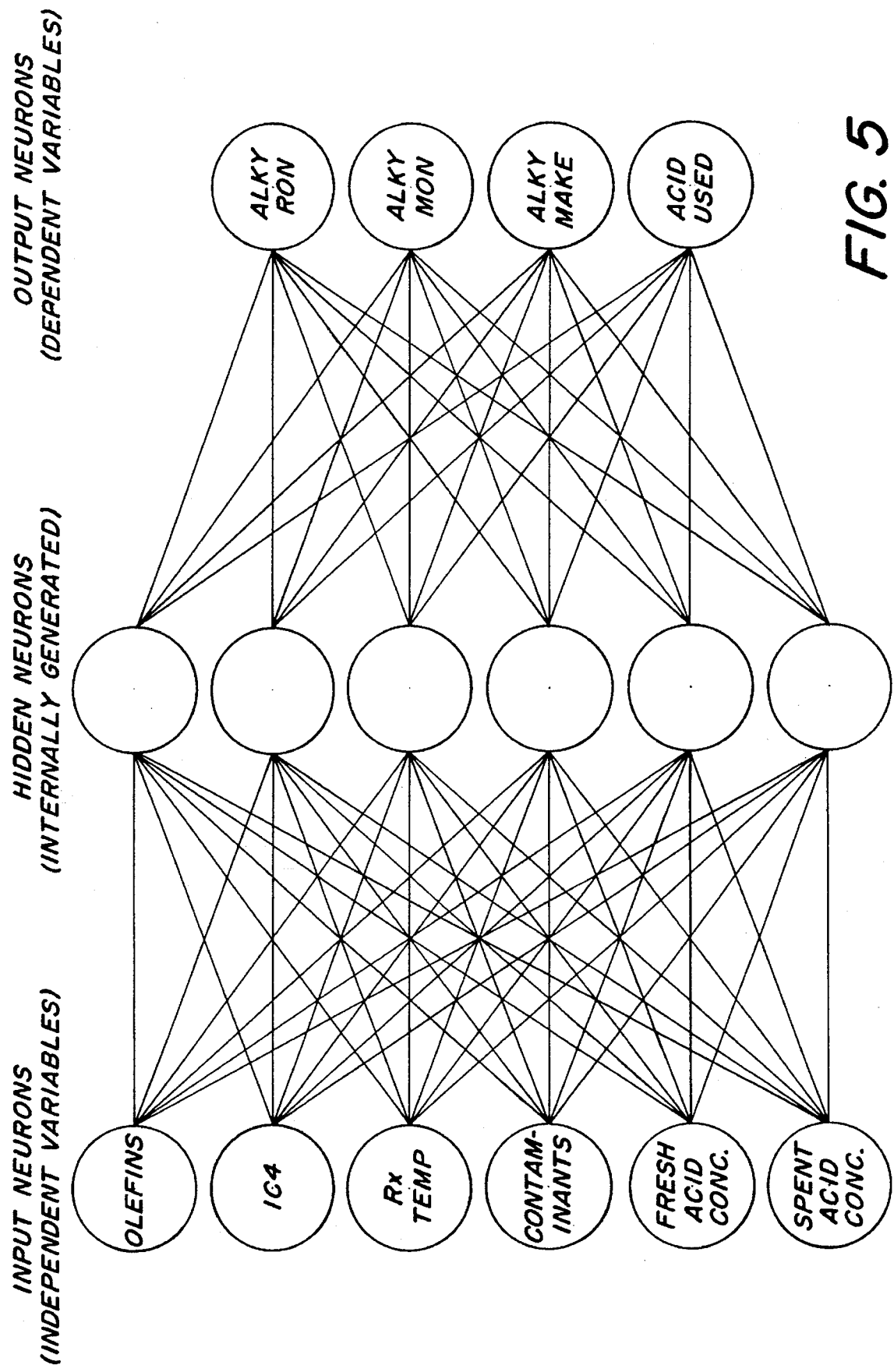
FIG. 5 shows in diagrammatic form an exemplary neural network model for an alkylation process.

An exemplary neural network model for an alkylation unit is shown in FIG. 5. As can be seen in the figure, the model comprises six input neurons which represent independent variables, it has a second layer of six hidden neurons and an output layer of four neurons or dependent variables. In this case, the independent variables of the process are Olefin (the short chain hydrocarbon flow rate); the IC4 (the Isobutane flow rate); the Rx TEMP (the temperature of the reactor of the alkylation unit); the Contaminants which can include methanol, water or sulphur compounds; the Fresh Acid concentration (the strength of the acid catalyst at the input to the process); and the Spent Acid concentration (the strength of the catalyst at the output of the process). The four dependent variables of the network are the Alky RON (the Research Octane Number of the gasoline output of the process); Alky MON (the Motor Octane Number of the gasoline output of the process); Alky Make (the output or yield of the process); and Acid Used (the quantity of the acid used by the process).

As previously described, the independent variables are the variables which are controllable and the dependent variables represent various outputs of the system which can be controlled by varying the levels of the input variables. The number of hidden neurons and the number of layers of hidden neurons are chosen by the designer of the model. If too few hidden neurons are used, the model will not be able to predict outputs accurately with respect to changes in the independent variables. If too many hidden neurons are used the model becomes too sensitive to slight changes and cannot accurately determine general trends. An initial rule of thumb is to use as many hidden neurons as the average of the number of input neurons and output neurons or to use as many hidden neurons as the number of input neurons.

Since each process is to some extent unique, the process control model must learn from historical data taken on the specific process to be controlled. Thus, referring again to FIG. 1, the manual input to the data acquisition processor 8 (Block B), which can be a keyboard or other input device, is used to load historical data into the data acquisition processor. The data representing on-line values of independent and dependent variables recorded from the process, are presented to the process model. The process model, which in this case is a neural network, predicts the dependent variable values based upon the independent variable values. The neural network then determines the difference between its predicted dependent variable values and the actual dependent variable values and adjusts the weighting assigned to the independent variables in accordance with a learning rule inserted into the model. As more and more historical data is presented to the neural network model, it learns and becomes more accurate in its predictions. This is similar to a human brain, which based upon experience, can more accurately determine future events.

A set of data on an actual operating process using the process model of the present invention is shown in FIGS. 6A–6D. FIGS. 6A and 6B show the independent variables of the model, (25 variables); and the dependent variables, (3 variables). In this case the dependent variables are Yield, Acid consumption and Research Octane Number (RON). The limits for each of the variables, i.e., the maxima and minima values as determined by historical data, are given in the table in FIGS. 6A and 6B. A dictionary of the variables is given in FIG. 6B.

Any one of the independent variables may be used as the control variable for optimizing the system with relation to the output or dependent variables. In addition, as discussed previously, the process may be optimized to meet economic goals.

FIGS. 6C and 6D tabulate the results of the testing wherein actual measurements of dependent variables were compared to predicted values of the dependent variables based upon a set of independent variable values from the process. The statistics were compiled from a set of data using individual points of the neural network model, and for a set of data using five point subgroups. For each of the dependent variables, as shown in the table at the top of FIG. 6C, 293 measurements of the 25 independent variable levels were made. The 293 measurements were also combined into 59 subgroups for a five point subgroup model. For each of the dependent variables, the standard error of the model SE, the correlation coefficient R2, and the standard deviation SD, are given for the individual point model and the five point subgroup model.

The prediction limits for each of the variables, for the individual points model and for the five point subgroup model are given in the second and third charts of FIGS. 6C and 6D. These include the lower control limit (LCL), the average at minus 2 SD (Standard Deviations), the average at minus 1 SD, the average, the average at plus 1 SD, the average at plus 2 SD, and the upper control limit, are given.

The chart of FIG. 6D gives the validation statistics for the five point subgroup model. As can be seen in the chart, the model prediction for the average Yield is 0.15 percent less than the actual prediction, the average Acid consumption predicted by the model is 0.17 percent higher than the actual average Acid consumption, and the average Research Octane Number for the model is 0.1 percent above the actual average Research Octane Number. Also shown in FIG. 6D are the definitions of the statistical parameters used to evaluate the data.

In addition to the controlling of processes in the petroleum refinery field, as illustrated in this embodiment, the process control system of the instant invention is also applicable for the control of other types of processes. For example, in boiler processes, a deposit of solids which are dissolved in the water, tends to build-up on the sides of the boiler. The build-up is called fauling, and anti-foulants are often used to slow down the build-up of deposits. As deposits build-up on the inner walls of the boilers, the system becomes less efficient and more fuel and a higher temperature are required to raise the temperature of the water to the desired level. After a period of time, the boiler must be shut down and the deposits removed from the walls. This process is time consuming and results in increased costs and reduction in capacity of the system.

Additives to prevent fauling build-up (anti-foulants), by slowing down and minimizing the build-up, allow the system to operate more efficiently and for longer periods of time before shutdown.

Application of the instant invention to a boiler system could use for example the amount of fuel, the type of fuel, the measurement of the amount of dissolved solvents in the water, the rate of flow of the fuel, and the anti-foulant flow rate as independent variables. Objectives for optimization of the system could be maximizing the time between shutdowns, minimizing fuel costs, maximizing return on investment with regard to the chemical additive, maximizing process output or minimizing maintenance, labor and costs.

The application of this process control system to such a boiler process could entail the use of the flow rate of the anti-foulant chemical additive as the controllable independent variable in a fashion similar to the use of the additive control rate for optimization of the alkylation unit process given previously.

A process control system has been described which is applicable, generally, to industrial commercial processes. It comprises both a process model, such as a neural network model, and an economic model. This enables the process to be optimized for obtaining objectives relating to maximizing or minimizing dependent output variables or optimization of the system to meet economic criteria such as overall production value, return on investment, minimization of costs, and the like.

Without further elaboration, the foregoing will so fully illustrate my invention that others may, by applying current or future knowledge, readily adapt the same for use under the various conditions of service.

We claim:

1. A system for optimizing and controlling a process comprising:
   (a) means for obtaining and receiving data, on-line and in real-time, representing the levels of a plurality of independent input variables of said process and the levels of at least one dependent output variable of said process;
   (b) means for storing said data;
   (c) means for determining the interrelationships among said plurality of independent input variables and the relationships between said plurality of independent variables and said at least one dependent output variable;
   (d) means for generating a plot of said level of a selected one of said at least one dependent output variables at incremental levels of a selected one of said plurality of input variables over a pre-selected range of levels of said selected one of said plurality of said independent input variables;
   (e) means for providing data representing at least one objective for said system relating to said at least one dependent output variable;
   (f) means for obtaining a calculated level of a selected one of said plurality of independent input variables to meet said objective by determining the maximum or minimum level of said plot;
   (g) means for moving said selected one of said plurality of independent variables to said calculated level; and
   (h) means for obtaining a calculated level for each of said plurality of independent variables in turn and for iteratively moving each of said plurality of independent variables to said respective calculated level.

2. The system of claim 1 wherein said means for determining said interrelationships and said relationships comprises a neural network model, which is trained off-line.

3. The system of claim 2 wherein said means for obtaining and receiving data comprises automatic means and said means for inserting said calculated value comprises automatic means.

4. The system of claim 2 wherein said means for obtaining and receiving data comprises automatic means and said means for inserting said calculated value comprises manual means.

5. The system of claim 2 wherein said means for obtaining and receiving data comprises manual means and said means for inserting said calculated value comprises manual means.

6. The system of claim 2 wherein said means for obtaining and receiving data comprises manual means and said means for inserting said calculated value comprises manual means.

7. The system of claim 2 wherein said system further comprises a computer with a memory for storing historical data relating to said process.

8. The system of claim 7 wherein said neural network comprises software in said computer which determines said interrelationships and relationship.

9. The system of claim 2 wherein said system further comprises an economic model.

10. The system of claim 9 wherein said system further provides means for receiving data representing at least one economic objective of said system.

11. The system of claim 10 wherein said economic model further comprises means for obtaining a calculated level of a selected one of said plurality of independent input variables to meet said economic objective.

12. A system for optimizing and controlling a process comprising:
(a) means for obtaining and receiving data, on-line and in real-time, representing the levels of a plurality of independent input variables of said process and the level of at least one dependent output variable of said process;
(b) means for storing said data;
(c) means for determining the interrelationships among said plurality of independent input variables and the relationships between said plurality of independent input variables and said at least one dependent output variable;
(d) means for generating a plot of said level of a selected one of said at least one dependent output variables at incremental levels of a selected one of said plurality of input variables over a pre-selected range of levels of said selected one of said plurality of said independent input variables;
(e) means for providing data representing at least one economic objective relating to an economic criteria to said system;
(f) means for generating a plot of the values of said economic criteria over said pre-selected range of levels of said selected one of said plurality of independent input variables;
(g) means for obtaining a calculated level of said selected one of said plurality of independent input variables to meet said economic objective by determining the maximum or minimum level of said plot;
(h) means for moving said selected one of said plurality of independent variables to said calculated level; and
(i) means for obtaining a calculated level for each of said plurality of independent variables in turn and for iteratively moving each of said plurality of independent variables to said respective calculated level.

13. The system of claim 1 wherein said means for determining said interrelationships and said relationships comprises a neural network model, which is trained off-line.

14. The system of claim 2 wherein said means for providing said economic basis and desired objective comprises an economic model.

15. The system of claim 3 wherein said means for obtaining and receiving data comprises automatic means and said means for inserting said calculated value comprises automatic means.

16. The system of claim 3 wherein said means for obtaining and receiving data comprises automatic means and said means for inserting said calculated value comprises manual means.

17. The system of claim 3 wherein said means for obtaining and receiving data comprises manual means and said means for inserting said calculated value comprises manual means.

18. The system of claim 3 wherein said means for obtaining and receiving data comprises manual means and said means for inserting said calculated value comprises automatic means.

19. The system of claim 3 wherein said system further comprises a computer with a memory for storing historical data relating to said process.

20. The system of claim 8 wherein said neural network comprises software in said computer which determines said interrelationships and relationships.

21. The system of claim 9 wherein said at least one economic objective comprises maximizing the total value of the output of said process.

22. The system of claim 9 wherein said at least one economic objective comprises maximizing the return on investment of the output of said process.

23. The system of claim 9 wherein said system controls a chemical process.

24. The system of claim 12 wherein said selected parameter comprises the injection rate of a chemical additive to said chemical process.

25. The system of claim 12 wherein said at least one economic objective comprises minimizing the level of consumption of catalytic material of said process.

26. The system of claim 12 wherein said at least one economic objective comprises maximizing the quality of the output of said process.

27. The system of claim 4 wherein said automatic means for storing said data comprises a data acquisition processor.

28. The system of claim 5 wherein said automatic means for storing said data comprises a data acquisition processor.

29. The system of claim 13 wherein said means for inserting said calculated level comprises a chemical pump controller and a chemical pump.

30. A system for controlling a petroleum reaction process for producing gasoline, said process comprising:
(a) means for obtaining and receiving data, on-line and in real-time, representing the levels of a plurality of independent input variables of said process and the level of at least one dependent output variable of said process;
(b) means for storing said data;
(c) means for determining the interrelationships among said plurality of independent input variables and the relationships between said plurality of independent input variables and said at least one dependent output variable;
(d) means for generating a plot of said level of a selected one of said at least one dependent output variables at incremental levels of a selected one of said plurality of input variables over a pre-selected range of levels of said selected one of said plurality of said independent input variables;
(e) means for providing data representing at least one economic objective relating to an economic criteria to said system;
(f) means for generating a plot of the values of said economic criteria over said pre-selected range of levels of said selected one of said plurality of independent input variables;
(g) means for obtaining a calculated level of said selected one of said plurality of independent input variables to meet said economic objective by determining the maximum or minimum level of said plot;
(h) means for moving said selected one of said plurality of independent variables to said calculated level; and
(i) means for obtaining a calculated level for each of said plurality of independent variables in turn and for iteratively moving each of said plurality of independent variables to said respective calculated level.

31. The system of claim 30 wherein said means for determining said interrelationships and said relationships comprises a neural network model, which is trained off-line.

32. The system of claim 31 wherein said means for providing said economic basis and desired objective comprises an economic model.

33. The system of claim 32 wherein said means for obtaining and receiving data comprises automatic means and said means for inserting said calculated value of said chemical additive comprises automatic means.

34. The system of claim 33 wherein said means for obtaining and receiving data comprises automatic means and said means for inserting said calculated value of said chemical additive comprises manual means.

35. The system of claim 34 wherein said means for obtaining and receiving data comprises manual means and said means for inserting said calculated value of said chemical additive comprises manual means.

36. The system of claim 35 wherein said means for obtaining and receiving data comprises manual means and said means for inserting said calculated value of said chemical additive comprises automatic means.

37. The system of claim 36 wherein said system further comprises a computer with a memory for storing historical data relating to said process.

38. The system of claim 37 wherein said neural network comprises software in said computer which determines said interrelationships and relationships.

39. The system of claim 38 wherein said at least one economic objective comprises maximizing the total value of the output of said gasoline of said process.

40. The system of claim 39 wherein said at least one economic objective comprises maximizing the return on investment of the chemical additive of said process.

41. The system of claim 40 wherein said at least one economic objective comprises minimizing the level of consumption of catalytic material of said process.

42. The system of claim 41 wherein said at least one economic objective comprises maximizing the octane number of said gasoline.

43. The system of claim 33 wherein said automatic means for storing said data comprises a data acquisition processor.

44. The system of claim 34 wherein said automatic means for storing said data comprises a data acquisition processor.

45. The system of claim 33 wherein said automatic means for inserting said calculated level comprises a chemical pump controller and a chemical pump.

46. The system of claim 35 wherein said automatic means for inserting said calculated level comprises a chemical pump controller and a chemical pump.

* * * * *